United States Patent
White et al.

(10) Patent No.: US 12,038,298 B2
(45) Date of Patent: Jul. 16, 2024

(54) GENERATING NAVIGATION INSTRUCTIONS

(71) Applicant: DoorDash, Inc., San Francisco, CA (US)

(72) Inventors: Graham White, Alton (GB); Andrew S. Feltham, Chandlers Ford (GB)

(73) Assignee: DoorDash, Inc., San Francisco, CA (US)

( * ) Notice: Subject to any disclaimer, the term of this patent is extended or adjusted under 35 U.S.C. 154(b) by 103 days.

(21) Appl. No.: 17/705,827

(22) Filed: Mar. 28, 2022

(65) Prior Publication Data

US 2022/0221295 A1    Jul. 14, 2022

Related U.S. Application Data (63) Continuation of application No. 16/677,728, filed on Nov. 8, 2019, now Pat. No. 11,287,276, which is a (Continued)

(51) Int. Cl.
*G01C 21/36* (2006.01)
*G01S 19/45* (2010.01)
(Continued)

(52) U.S. Cl.
CPC ..... *G01C 21/3626* (2013.01); *G01C 21/3602* (2013.01); *G01C 21/3611* (2013.01);
(Continued)

(58) Field of Classification Search
CPC ............ G01C 21/3626; G01C 21/3602; G01C 21/3611; G01C 21/3629; G01C 21/3644; G01C 21/3647; G01S 19/45; G06V 20/58; G08G 1/096827; G08G 1/096833; G08G 1/096872
See application file for complete search history.

(56) References Cited

U.S. PATENT DOCUMENTS 5,199,014 A    3/1993    Homburg et al.
5,961,571 A    10/1999   Gorr
(Continued)

OTHER PUBLICATIONS

Zolfgharifard, "Google reveals its self-driving car can keep an eye on cyclists—and even understand their hand signals", Daily Mail, Published May 6, 2015, Copyright Associated Newspapers Ltd., 35 pages. http://www/.dailymail.co/uk/sciencetech/article-3070672/Are-self-driving-cars-danger-cyclists-Google-patents-way-autonomous-vehicles-understand-hand-signals.html.
(Continued)

*Primary Examiner* — Mary Cheung
(74) *Attorney, Agent, or Firm* — Kilpatrick Townsend & Stockton LLP (57) ABSTRACT

Concepts for generating navigation instructions for a driver of a vehicle are presented. One example, includes obtaining a current location of the vehicle, a route for the vehicle from the current location to a target destination, and a captured image of the surrounding environment of the vehicle, the image having a field of view comprising at least part of a field of view of the driver. An object is identified in the captured image. Navigation instructions for the driver are generated based on the current location of the vehicle, the route for the vehicle and the object identified in the captured image.

20 Claims, 6 Drawing Sheets

Related U.S. Application Data continuation of application No. 15/678,411, filed on Aug. 16, 2017, now Pat. No. 10,527,443.

(51) Int. Cl.
  *G06V 20/58* (2022.01)
  *G08G 1/0968* (2006.01)

(52) U.S. Cl.
  CPC ..... *G01C 21/3629* (2013.01); *G01C 21/3644* (2013.01); *G01C 21/3647* (2013.01); *G01S 19/45* (2013.01); *G06V 20/58* (2022.01); *G08G 1/096827* (2013.01); *G08G 1/096833* (2013.01); *G08G 1/096872* (2013.01)

(56) References Cited

U.S. PATENT DOCUMENTS

| | | | |
|---|---|---|---|
| 6,947,064 B1* | 9/2005 | Hahn | G08G 1/0962 345/958 |
| 8,423,292 B2 | 4/2013 | Geelen et al. | |
| 8,548,725 B2 | 10/2013 | Epshtein et al. | |
| 9,014,905 B1 | 4/2015 | Kretzschmar et al. | |
| 9,518,829 B2 | 12/2016 | Parker et al. | |
| 2010/0289632 A1 | 11/2010 | Seder | |
| 2012/0033077 A1 | 2/2012 | Kitaura | |
| 2013/0315446 A1 | 11/2013 | Ben Tzvi | |
| 2014/0063064 A1 | 3/2014 | Seo | |
| 2014/0192181 A1 | 7/2014 | Taylor | |
| 2014/0372020 A1* | 12/2014 | Stein | G01C 21/3602 701/410 |
| 2015/0336547 A1* | 11/2015 | Dagan | G06V 20/58 701/70 |
| 2015/0344028 A1* | 12/2015 | Gieseke | B60W 30/095 348/148 |
| 2017/0343372 A1 | 11/2017 | Vandanapu | |
| 2019/0056237 A1* | 2/2019 | White | G01C 21/3626 |

OTHER PUBLICATIONS

Goodwin, "Navigation meets dash cam with an augmented-reality twist. Garmin announces the NuviCam", Road Show, CNET, Apr. 23, 2015, © CBS Interactive Inc., 12 pages. https://www.cnet.com/roadshow/news/teslas-model-30marketing-strategy-ditches-specs-for-end-results/.

Gao et al., "Self Lane Assignment Using Egocentric Smart Mobile Camera for Intelligent GPS Navigation", 2009 IEEE Computer Society Conference on Computer Vision and Pattern Recognition Workshops, 2009, doi: 10.1109/CVPRW.2009.5204359, 6 pages. http://ieeexplore.ieee.org/documents/5204359/metrics.

Pink, "Visual map matching and localization using a global feature map", 2008 IEEE Computer Society Conference on Computer Vision and Pattern Recognition Workshops, 2008, 7 pages, doi: 10.1109/CVPRW.2008.4563135. http://ieeexplore.ieee.org/documents/4563135/.

"Garmin Real Directions", Published May 9, 2013, YouTube, https://www.youtube.com/watch?v=R6RGI_EyY8, 3 pages.

"Object detection in the wild by Faster R-CNN + ResNet-101", Published Jun. 19, 2016, YouTube, https://www.youtube.com/watch?v=WZmSMkK9VuA, 3 pages.

"Color Name & Hue", Colblindor, © 2006-2016 by Colblindor, printed Aug. 16, 2017, http://www.color-blindness.com/color-name-hue/, 6 pages.

List of IBM Patents or Patent Applications Treated as Related, dated Nov. 15, 2019, 2 pages.

\* cited by examiner

GENERATING NAVIGATION INSTRUCTIONS

CROSS-REFERENCE TO RELATED APPLICATIONS

This application is a Continuation of U.S. application Ser. No. 16/677,728, filed on Nov. 8, 2019, which is a continuation of U.S. application Ser. No. 15/678,411, filed on Aug. 16, 2017, the disclosure of each of which is incorporated herein by reference in its entirety.

BACKGROUND

The present invention relates to vehicular navigation, and more particularly to a generating navigation instruction for a driver of a vehicle.

Many known systems and applications provide the ability to give directions or navigation instructions. Examples of include web-based map applications and satellite-based navigation systems. Typically, these applications and systems give navigation instructions in the form of lists of intersections at which a user is to change direction. For example, navigation instructions might communicate a message comprising the instruction "Proceed for 1.5 miles, and then turn right on New Street."

In particular, it is common for navigation applications and system to provide visual (displayed) and/or audible (e.g. or spoken) instructions, along with a map of the intersection at which the change of direction is to take place. For example, when the directions call for a turn at the intersection of New Street and Old Street, a vehicle navigation system may display a map of that intersection when the vehicle approaches the turn and communicate instructions (via a display and/or speaker) telling the driver of the vehicle to turn at the intersection of New Street and Old Street.

SUMMARY

According to an embodiment of the present disclosure there is provided a navigation instructions system for generating navigation instructions for a driver of a vehicle. The system includes an input interface adapted to receive a current location of the vehicle, a route for the vehicle from the current location to a target destination, and a captured image of the surrounding environment of the vehicle, the image having a field of view comprising at least part of a field of view of the driver. The system further includes an object identification unit adapted to identify an object in the captured image. The system further includes a navigation unit adapted to generate navigation instructions for the driver based on the current location of the vehicle, the route for the vehicle and the object identified in the captured image.

According to another embodiment of the present disclosure, there is provided a computer-implemented method for generating navigation instructions for a driver of a vehicle. The method includes obtaining a current location of the vehicle, a route for the vehicle from the current location to a target destination, and a captured image of the surrounding environment of the vehicle, the image having a field of view comprising at least part of a field of view of the driver. The method further includes identifying an object in the captured image. The method further includes generating navigation instructions for the driver based on the current location of the vehicle, the route for the vehicle and the object identified in the captured image.

According to another embodiment of the present disclosure, there is provided a computer program product for performing the above method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Navigation instructions provided by navigation applications and systems are sometimes difficult to follow. Maps are simplified schematic representations of actual geographic features (such as roads, signs, intersections, etc.), and some people are not adept at relating these simplified abstractions to actual geographic features. Moreover, communicated navigation instructions may not correspond well with the actual geographic features visible to a user. For example, some intersections, or street crossings at oblique angles, may not appear in real life as they do on a displayed map. Additionally, in some areas and/or circumstances, geographic features may not be easily visible and/or may be unclear, which also can make navigation instructions difficult to follow.

Proposed is a concept for generating navigation instructions for a driver of a vehicle. By identifying an object in a captured image of the driver's view, the navigation instructions may be generated based on the identified object, so as to provide an instruction which may be presented in a context of the driver's view or the circumstances of the environment surrounding the vehicle. Embodiments may therefore provide situational directions that account for one or more objects that may be visible to the driver of the vehicle. In this way, more natural instructions (e.g. common language and expressions) may be provided to a driver which, for instance, comprise cues accounting for an object in sight of the driver.

As an example, an embodiment may identify a car parked by an entrance to a road of a desired route, and the parked car may obscure the driver's view of a sign identifying the road. Taking account of the identified car, the embodiment may generate a navigation instruction that instructs the driver to turn into the road directly after the parked car (e.g. by providing the audible instruction "turn right into New Road behind the red car park on the right").

Thus, embodiments may generate navigation instructions that include a current context of the route, vehicle and/or the driver's view. In this way, directions provided by proposed embodiment may provide additional assistance or clues to a driver of a vehicle based on objects which may be visible to the driver of the vehicle. Also, the objects may be temporary in nature, in that they may not be permanent geographical features (such as a landmark, building, signpost, etc.), but may instead comprise objects that are only temporarily located at their position and/or moving (such as another vehicle within sight of the driver for example). As a result, embodiments need not rely on identifying permanent landmarks or geographic features when identifying objects, and this may be advantageous because a current context or circumstance of the vehicle and/or the driver's view may prevent identification of such landmarks or geographic features (e.g. because they may be hidden behind a vehicle in the driver's view). Reliance on up-to-date records of landmarks or geographic features may also be avoided by employing such a concept.

Embodiments may propose the use of a vehicle-mounted camera or image capture device, an objection recognition system, current GPS positioning of the vehicle, and mapping data. Using this, embodiments may assess the camera images to identify objects within a field of view of the driver and analyze the identified objects in conjunction with the current position of the vehicle and its planned route to generate guidance instruction for the driver, where the instructions relate to an object within the driver's field of view. Proposed embodiments may therefore provide situational directions that are context dependent (i.e. relate to a current context of the vehicle), for example by referring to a current visible scene in front of the car (including temporary objects such as vehicles or pedestrians).

Purely by way of example, an embodiment may employ a forward-looking camera mounted on the front of a vehicle such that it is able to capture an image having a similar view as that of the driver of the vehicle. Image analysis may be undertaken on board the vehicle with a suitable image processing equipment so as to identify one or more objects in the driver's view and then generate guidance instructions that refer to the one or more objects. Alternatively, or additionally, image analysis may be undertaken in a distributed processing environment (such as a cloud-based processing environment for example).

Guidance (or navigation instructions) generated by embodiments may be optionally used depending on a number of factors, such as how recently a direction may have been given or the potential accuracy of other available directions for example. Thus, a decision may be made by a navigation system employing a proposed embodiment about which, of a plurality of directions, may be preferable to provide the driver at any point in time.

Proposed embodiments may use information from a global positioning system (GPS) (such as a satellite navigation ('SatNav') system) as an input to an image processing system. This may allow the image processing system determine an object in the scene about which directional information may be obtained. In this way, embodiments may be capable of selecting an object (such as a vehicle or person) in the driver's view and generating a direction/instruction for the driver which refers or relates to the selected object.

Proposed embodiments may help to provide navigation instructions to a driver of a vehicle that are simple to understand and/or effective by including reference to objects visible to the driver. Navigation instructions provided by embodiments may thus be more 'natural' (in that they may replicate instructions that would otherwise be provided by a human) and/or using natural language expressions including reference to objects such a stationary or moving vehicles in the field of view of a user.

In particular, proposed concepts may be centered on visually detecting the presence of an object (such as a vehicle or person) on or near a vehicle's planned route and then generating navigation instructions (e.g. route guidance) which take account of the detected object (e.g. by including one or more references to the object).

Embodiments may thus provide concepts that facilitate the efficient and effective creation of navigational instructions for a vehicle driver. Such navigational instructions may account for a current context such as one or more other vehicle's in the driver's view.

By way of further example, embodiments may propose extensions to an existing navigation system. Such extensions may enable the navigation system to provide context-based navigation instruction by leveraging proposed concepts. In this way, a conventional navigation system may be upgraded by 'retro-fitting' a proposed embodiment.

Illustrative embodiments may provide concepts for analyzing the current visual context or circumstances of a vehicle and adapting navigation instruction for the driver of the vehicle so as to refer to the visual context/circumstances. Dynamic analysis and guidance generation concepts may therefore be provided by proposed embodiments.

Modifications and additional steps to a traditional vehicle navigation system or method may also be proposed which may enhance the value and utility of the proposed concepts.

Vehicles may include, but are not limited to, cars, bicycles, motorcycles, lorries, van, commercial vehicles, public transport vehicles, private transport vehicles, autonomous vehicles, emergency service vehicles, and the like. By use of the subject-matter disclosed herein, navigation instructions for a driver of such vehicles may be adapted to refer to one or more vehicles or persons in visible range of the driver. Accordingly, as used herein, the term "vehicle" may refer to any vehicle that may be driven or operated by a driver.

In examples provided herein, an object identification process may be adapted to identify a first vehicle (e.g. another vehicle other than the vehicle being driven by the driver and employing an embodiment) in a captured image of the driver's view. Navigation instructions for the driver may then be generated so as to include an instruction relating to the first vehicle. For example, an embodiment may identify a car parked just beyond the entrance to a road of a planned route, and then generate a navigation instruction which communicates to the driver "Turn left in to New Road just before the parked car on the left". Identification and subsequent reference may mean that embodiments refer to temporary objects (i.e. objects that may not be permanently located in a fixed position) and thus avoid a need to rely on information about fixed/permanent geographic features that may be obscured from a driver's current view.

Also, embodiments may determine a visual property of the first vehicle, and then generate navigation instructions which include a reference to the visual property of the first vehicle. For example, an embodiment may identify a red car parked just before the entrance to a road of a planned route, and then generate a navigation instruction which communicates to the driver "Turn left in to New Road just after the red car on the left". Easily understandable navigation instructions may thus be generated which may be more effective than navigation instructions which simply refer to a road name (since the road and/or its name may be obscured from the view of the driver for example).

Example embodiments may include an output interface adapted to generate a visible or audible output signal for communicating the generated navigation instructions to the driver. Embodiments may thus provide a visual signal and/or an audio signal (or a combination thereof) for communicating the generated navigation instructions to a user.

In a proposed embodiment, first and second images of the surrounding environment of the vehicle at first and second different times, respectively, may be employed. For example, video may be employed and an employed object identification process may identify a first object that appears in multiple (e.g. sequential) frames of the video. From this, a direction of movement of the identified first object may be determined and navigation instructions may then be generated based on the determined direction of movement of the first object. For example, an embodiment may identify a red car ahead turning in to a road of a planned route, and then generate a navigation instruction which communicates to the driver "Turn left in to New Road where the red car just went on the left". Easily understandable navigation instructions may thus be generated which may be more effective than navigation instructions which simply refer to a road name (since the road and/or its name may be obscured from the view of the driver for example).

Thus, according to an embodiment, if it is determined that the direction of movement of the first object (such as a car for example) corresponds to the route for the vehicle, navigation instructions may be generated for the driver which include an instruction instructing the driver to follow the first object.

Figure 1:
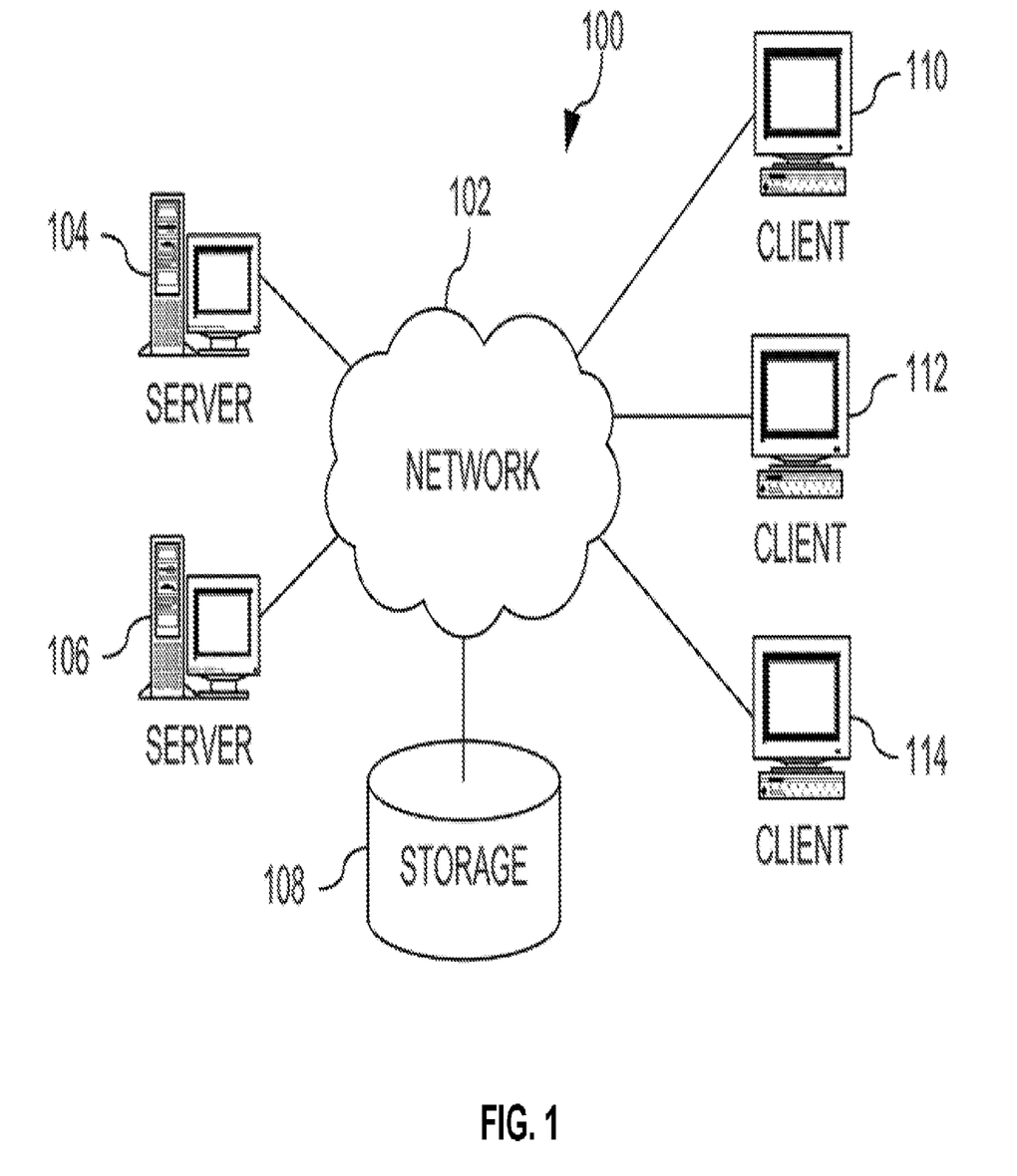
FIG. 1 depicts a pictorial representation of an example distributed system in which aspects of the illustrative embodiments may be implemented.

FIG. 1 depicts a pictorial representation of an example distributed data storage system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 server are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
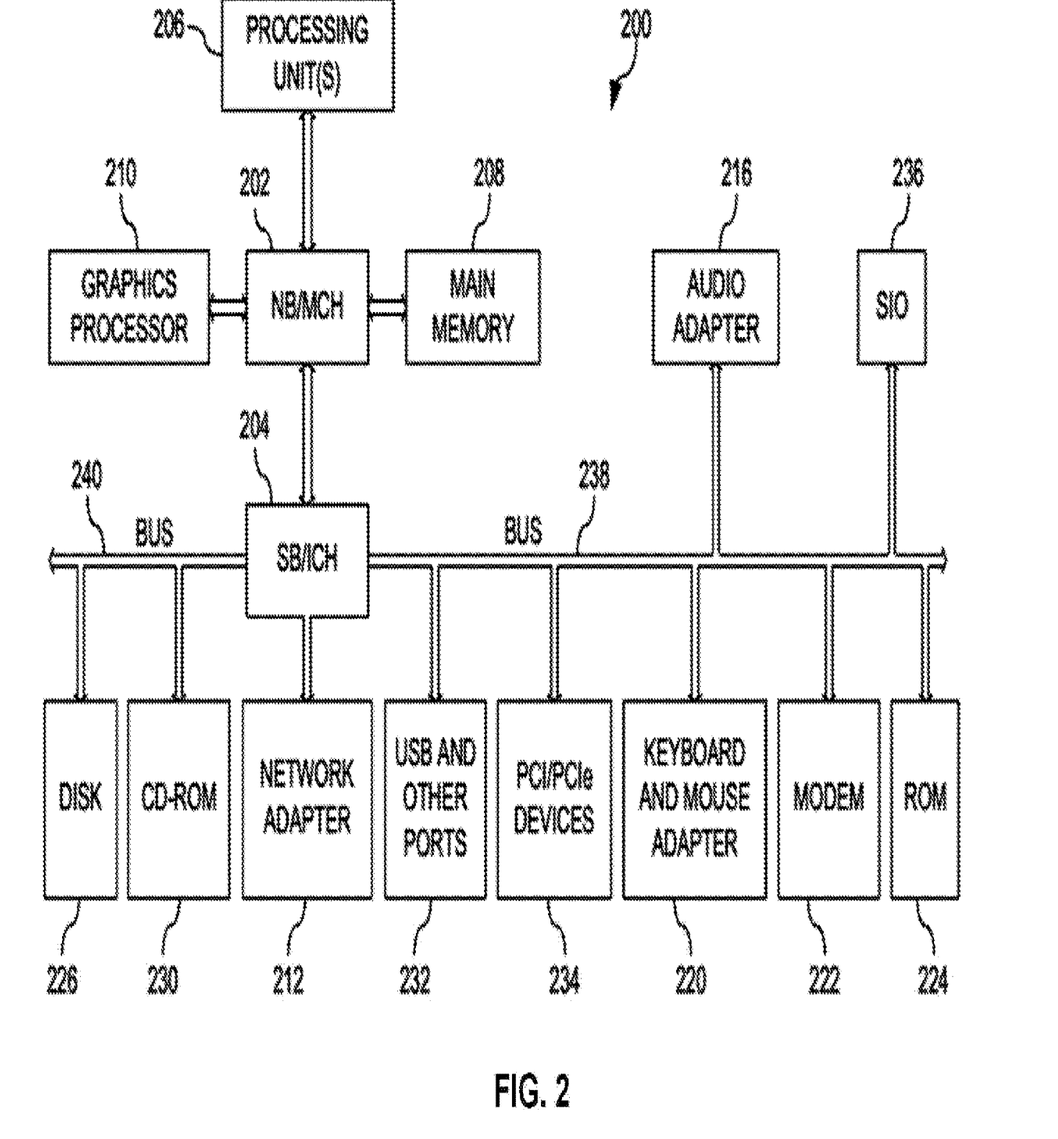
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a vehicle navigation system by providing navigation instructions which refer to a unique circumstance or context of the vehicle driver's view. Embodiments may identify an object, such as a car or pedestrian, in a captured image of (at least part of) the driver's view from the vehicle. Based on the identified object and planned route for the vehicle, a navigation instruction may be generated for the driver, and such an instruction may refer to the identified object for example. Contextual information about an object in view of the vehicle driver may therefore be leveraged in order to generate more relevant and/or clear route guidance for the driver. Circumstances of the environment surrounding the vehicle may therefore be drawn upon to provide a more natural and/or easily understood navigation instruction that is tailored to a driver's unique circumstances. Such proposals can extend or improve the navigation instructions provided by a vehicle navigation system.

Figure 3:
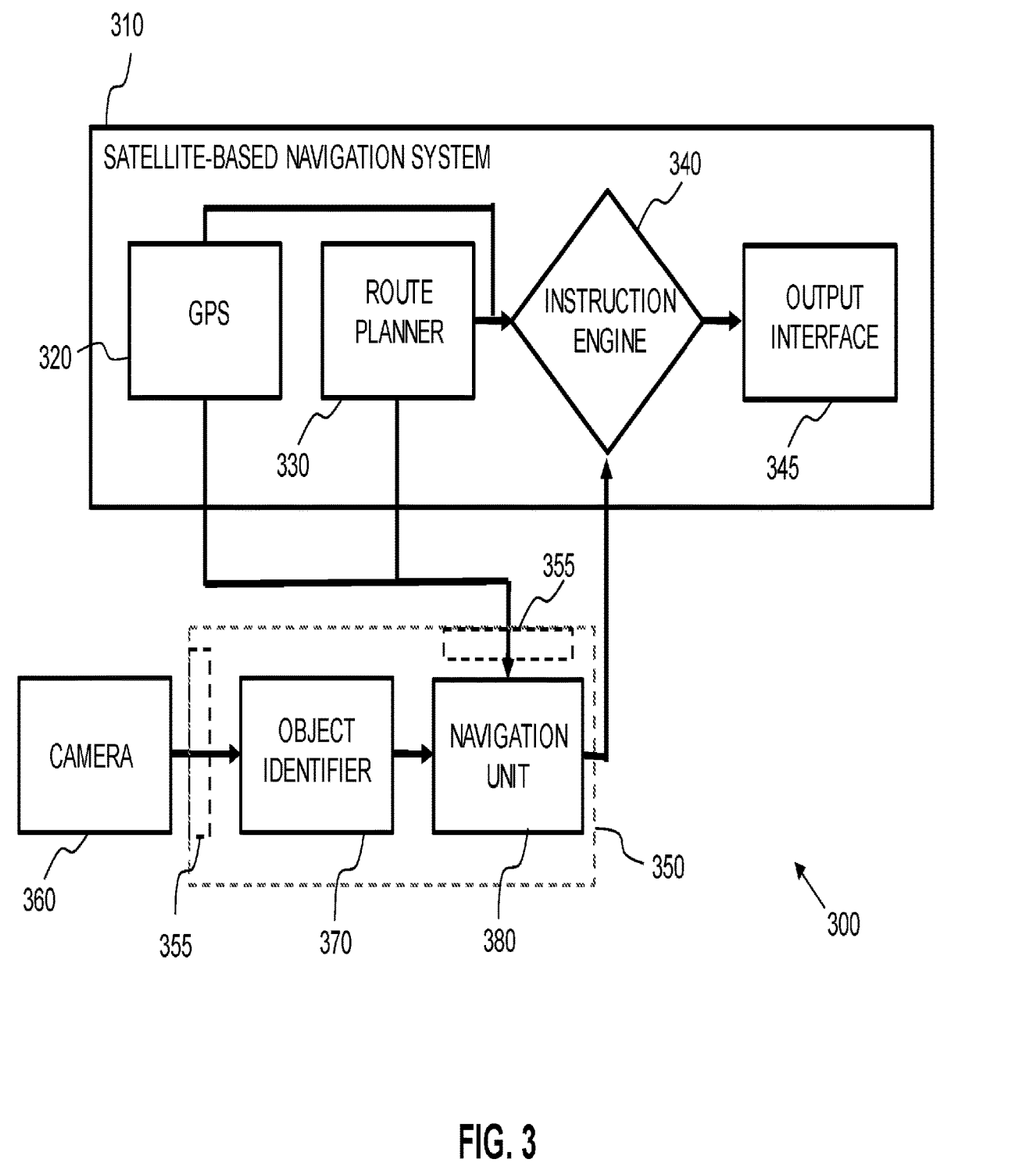
FIG. 3 is block diagram of a vehicle navigation system according to an embodiment.

FIG. 3 is a simplified block diagram of a vehicle navigation system 300 according to an embodiment.

The vehicle navigation system 300 comprises satellite-based navigation system 310 having a global positioning system (GPS) 320 adapted to ascertain a current location of a vehicle employing the vehicle navigation system 300. The satellite-based navigation system 310 also comprises a route planner 330 adapted to generate routing information relating to where the vehicle is travelling from (e.g. a starting point or location), where it is travelling to (e.g. an end point or location) and at what point/location it is currently at within this journey. The GPS 320 and the route planner 330 provide the current location and routing information to an instruction engine 340 of the satellite-based navigation system 310. The instruction engine 340 is adapted to generate navigation instructions (e.g. guidance instructions) based on the received current location and routing information. The instruction engine 340 is also adapted to determine whether and when to issue such navigation instructions to a driver of the vehicle. Thus, when it is determined appropriate, the instruction engine 340 provides generated navigation instructions to an output interface 345 of the satellite-based navigation system 310. The output interface 345 is adapted to output the received navigation instruction(s) to the driver of the vehicle a visual and/or audio signal.

The vehicle navigation system 300 of FIG. 3 also comprises a front-facing video camera 360 mounted on the vehicle so as to capture a view that is similar to (or covers at least part of) the view of the driver. Captured images and/or video are provided from the video camera 360 to a navigation instructions system 350 according to a proposed embodiment.

The navigation instructions system 350 is adapted to receive the captured image/video from the video camera 360 via an input interface 355. The navigation instructions system 350 is adapted to also receive, via the input interface 355, information about a current location of the vehicle from the GPS 320 and routing information for the vehicle from the route planner 300.

The navigation instructions system 350 comprises an object identifier 370 adapted to identify an object in the received image/video. In this example, the object identifier 370 is adapted to identify other vehicles in the received image/video.

The navigation instructions system 350 also comprises a navigation unit adapted to generate navigation instructions for the driver based on the information about the current location of the vehicle, the routing information for the vehicle and the object(s) identified in the captured image/video. In particular, the navigation instructions system 350 uses information from the GPS 320, the route planner 330 and the object identifier 370 to determine which (if any) vehicle in a scene visible to the driver may be used for route guidance.

Generated navigation instructions are provided from the navigation instructions system 350 to the instruction engine 340 for subsequent use in delivery of navigation instructions to the driver (via the output interface 345).

By way of additional explanation, an exemplary implementation of the system 300 of FIG. 3 will now be described with reference to FIG. 4. In this example, the front-facing video camera 360 records a scene in front of the vehicle. The captured video is provided to the object identifier 370 (via its input interface 355), and the object identifier analyses the video with a suitable vehicle recognition algorithm (of which there are many that are widely known and available) in order to identify other vehicles in the captured video.

Figure 4:
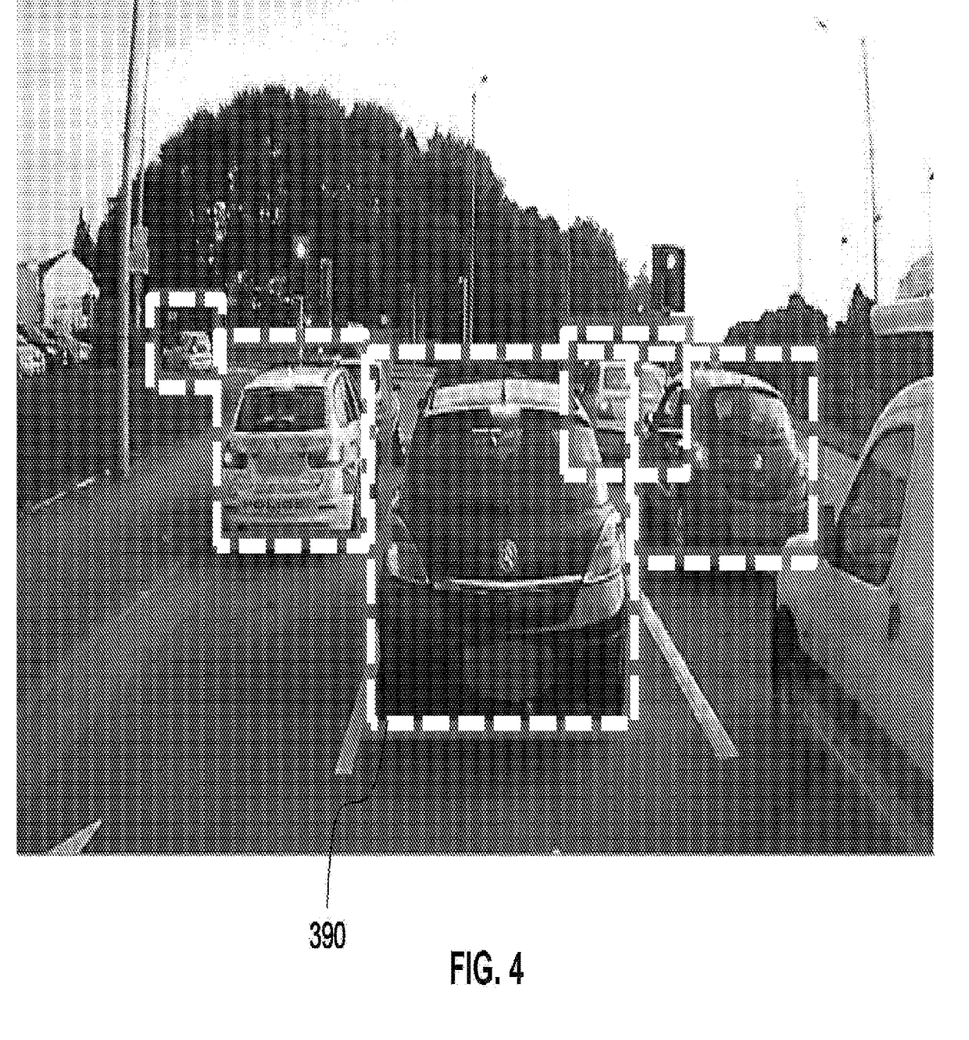
FIG. 4 depicts an example frame from video captured by a video camera and processed by the object identifier of FIG. 3.

An example frame from video captured by the video camera, as processed by the object identifier to identify other vehicles, is shown in FIG. 4. Thus, it will be appreciated that an output of the object identifier 370 comprises a plurality of vehicle bounding boxes 390 with associated color information and/or object identification and a delta indicating positioning of the bounding box in a previous video frame.

For example, the output represented in JSON format could be:

```
{
    vehicles: [
        {
            x: 325
            y: 174
            w: 100
            h: 100
            dx: 4
            dy: 10
            color: '#995533'
            object: 'car'
        },
        {
            ...
        }
    ]
}
```

By way of example, the numeric values may be pixel values, and the color string could be hex (as shown) or a color name e.g. "blue". The object string may be anything that the object identifier is adapted to detect such as a "car", "van", "lorry", "Supermarket lorry", "police car", etc.

The navigation unit 380 takes the output of the object identifier 370, in addition to information about where the vehicle is along the route and the mapping data from the satellite-based navigation system 310, and determines what instructions can be given as input to the instruction engine 340.

For example, the x (left-right), y (up-down), w (width) and h (height) values may be used to determine the position and size of the bounding box. The delta values may be used to determine in which direction an identified vehicle is moving. When combined with information from the satellite navigation system, it may be determined whether the bounding box is moving along the route yet to be travelled by the driver. If the bounding box is determined to be moving along the planned route, it may be determined to instruct the driver to follow the identified vehicle associated with the bounding box for example.

Over several frames of a video image any minor jitters in object detection can be normalized to determine an average position and size for the bounding box. This means the situational navigator will require a small amount of local storage in which to cache the previous N frames received from the object detector.

Also, the size of the bounding box may be used to determine how far away from the camera the object is, and thus the identified object may be mapped to a position in physical space using the mapping information provided by the satellite-based navigation system 310. In addition, over several frames the direction of a bounding box may be tracked by assessing the route taken by the bounding box across a series of images.

If a bounding box is determined to be travelling along the route yet to be travelled by the driver, the situational navigator may provide an output to the instruction engine 340. Such an output may comprise information relating to the identified object (e.g. car), a color of the identified object (e.g. blue), and a direction of travel or road name being navigated (e.g. New Road). This may enable the instruction engine 340 to optionally construct an instruction to the driver such as "Turn left into New Road, following the blue car ahead".

From the above description, it will be understood that proposed embodiments may employ the concept of identifying objects (such as other vehicle) in view of a driver of a vehicle by analyzing a captured image or video taken from the vehicle. Information about the identified object analyzed in conjunction with current location of the vehicle and a planned route of the vehicle for the purpose of determining in the identified object may be useful as a reference point/marker in guidance instructions for the vehicle. Proposed embodiments may therefore cater for situations where conventional guidance instructions are inadequate and/or unclear (because, for example, a junction or road name may not be visible to a driver). By identifying objects that may only be temporarily present, such objects may provide a unique and easily understandable context for navigation instructions that would otherwise not be applicable if permanent geographical features and/or fixed object were relied upon for route guidance. Of course, a combination of permanent geographical features and temporarily available objects (such as other vehicles or pedestrians) may be used for providing navigation instructions according to an embodiment. For example, it may be useful to refine conventional navigation instructions with additional contextual information relating to an object identified in the driver's view.

Figure 5:
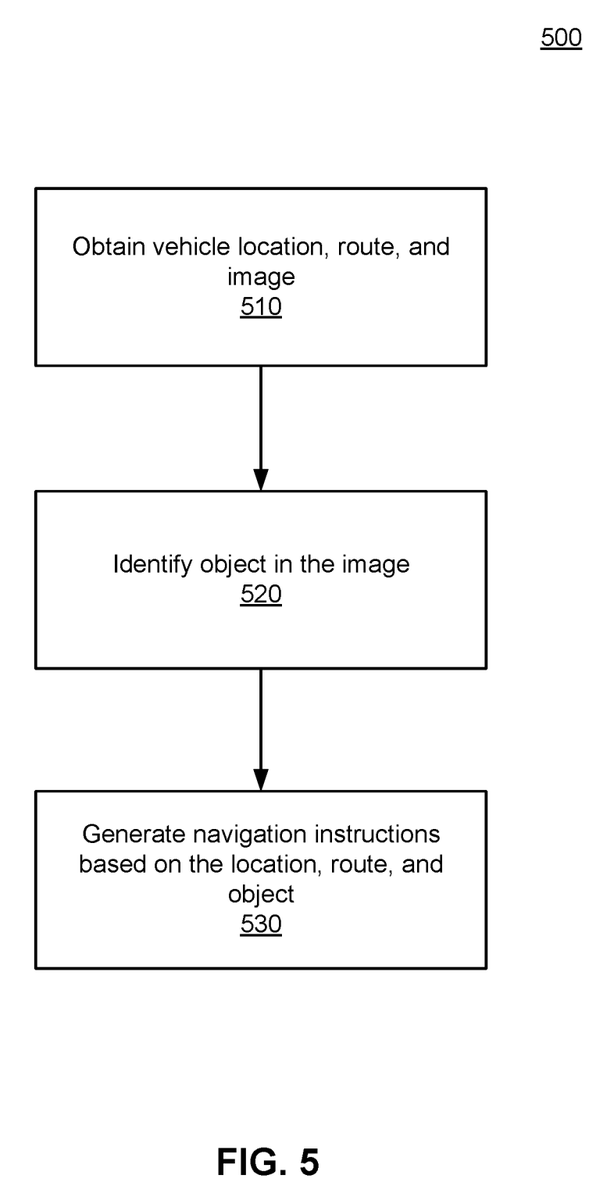
FIG. 5 depicts a flowchart of an example method for generating navigation instructions for a driver of a vehicle.

FIG. 5 depicts a flowchart of an example method 500 for generating navigation instructions for a driver of a vehicle. At block 510, a current location of the vehicle, a route for the vehicle from the current location to a target destination, and a captured image of the surrounding environment of the vehicle are obtained. At block 520, an object is identified in the captured image. At block 530, navigation instructions for the driver are generated based on the current location of the vehicle, the route for the vehicle and the object identified in the captured image.

Figure 6:
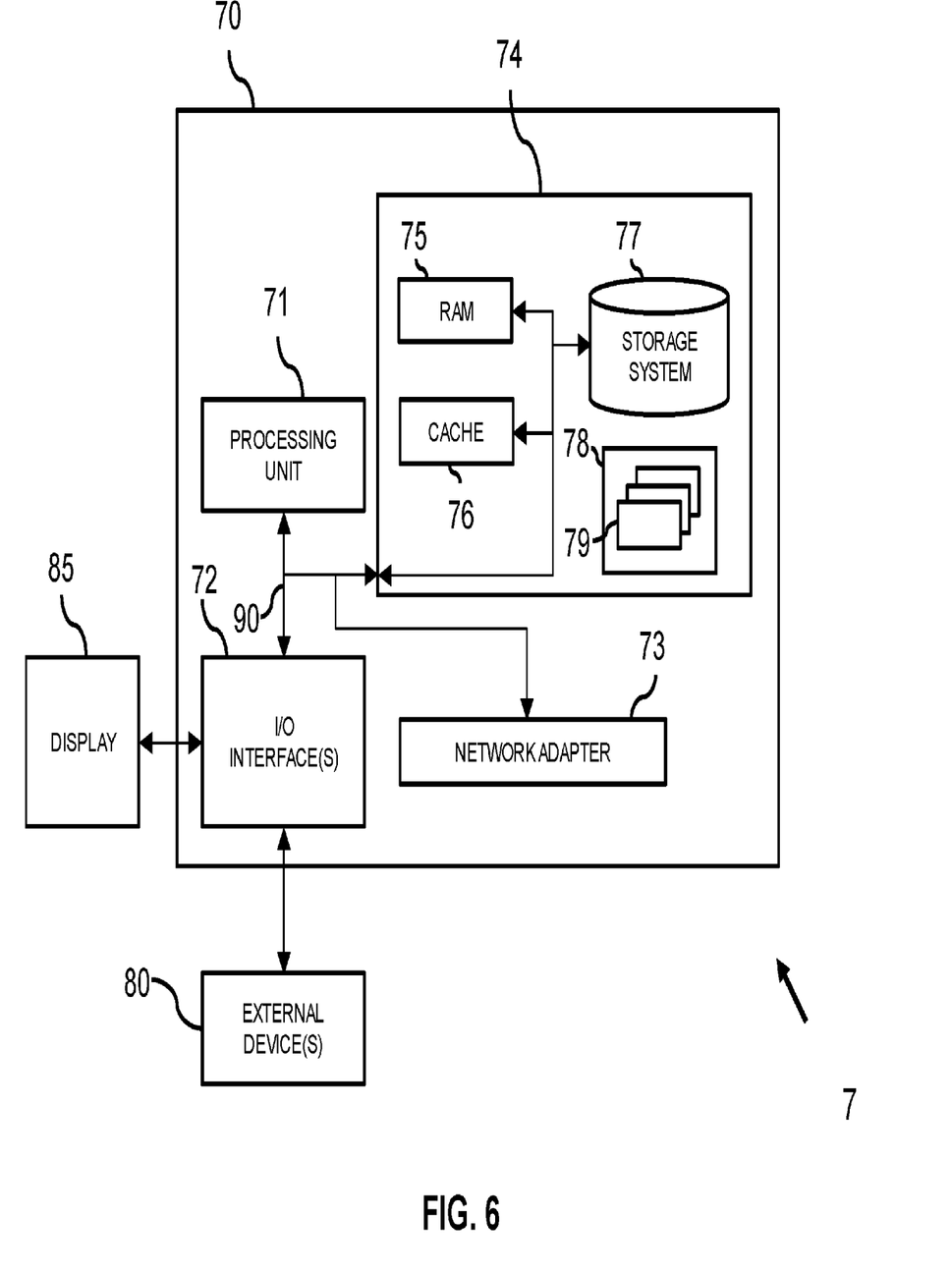
FIG. 6 illustrates a system for generating navigation instructions for a driver of a vehicle according to an embodiment.

By way of example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
receiving image data representative of an environment around a first vehicle;
identifying an object represented in the image data with a bounding box, the object being within a field of view of a driver of the first vehicle;
determining relative positioning of the identified object with respect to the first vehicle based on the bounding box represented in the image data; and
responsive to determining the relative positioning of the identified object with respect to the first vehicle, generating a navigation instruction for the driver of the first vehicle that includes a reference to the identified object.

2. The method of claim 1, further comprising:
determining a classification of the identified object based on the image data and referring to that classification in the reference to the identified object in the navigation instruction for the driver.

3. The method of claim 1, further comprising:
determining, based on the image data, that the identified object is a second vehicle moving with a direction of travel.

4. The method of claim 3, further comprising:
receiving navigation data representing a planned route of the first vehicle; and
determining that the direction of travel of the second vehicle corresponds to the planned route of the first vehicle and wherein the generated navigation instruction for the driver of the first vehicle includes an instruction to follow the second vehicle.

5. The method of claim 3, further comprising:
determining the direction of travel of the second vehicle based on the image data, wherein the image data represents a plurality of images of the second vehicle at different times thereby signifying the direction of travel of the second vehicle.

6. The method of claim 1, further comprising:
determining a property of the identified object based on the image data, the property including at least one of a color, a height, a width, and a depth of the identified object and wherein the generated navigation instruction for the driver of the first vehicle includes a reference to the determined property.

7. The method of claim 1, further comprising:
transmitting an output signal for communicating the generated navigation instruction to the driver of the first vehicle.

8. The method of claim 1, wherein the image data is collected by a front-facing sensor system located at a front of the first vehicle.

9. A system comprising:
one or more processors; and
a computer-readable medium comprising instructions stored therein, which when executed by the one or more processors, cause the one or more processors to:
receive image data representative of an environment around a first vehicle;
identify an object represented in the image data with a bounding box, the object being within a field of view of a driver of the first vehicle;

determine relative positioning of the identified object with respect to the first vehicle based on the bounding box represented in the image data; and responsive to determining the relative positioning of the identified object with respect to the first vehicle, generate a navigation instruction for the driver of the first vehicle that includes a reference to the identified object.

10. The system of claim 9, wherein the instructions, which when executed by the one or more processors, further cause the one or more processors to:

determine a classification of the identified object based on the image data and referring to that classification in the reference to the identified object in the navigation instruction for the driver.

11. The system of claim 9, wherein the instructions, which when executed by the one or more processors, further cause the one or more processors to:

determine, based on the image data, that the identified object is a second vehicle moving with a direction of travel.

12. The system of claim 11, wherein the instructions, which when executed by the one or more processors, further cause the one or more processors to:

receive navigation data representing a planned route of the first vehicle; and determine that the direction of travel of the second vehicle corresponds to the planned route of the first vehicle and wherein the generated navigation instruction for the driver of the first vehicle includes an instruction to follow the second vehicle.

13. The system of claim 11, wherein the instructions, which when executed by the one or more processors, further cause the one or more processors to:

determine the direction of travel of the second vehicle based on the image data, wherein the image data represents a plurality of images of the second vehicle at different times thereby signifying the direction of travel of the second vehicle.

14. The system of claim 9, wherein the instructions, which when executed by the one or more processors, further cause the one or more processors to:

determine a property of the identified object based on the image data, the property including at least one of a color, a height, a width, and a depth of the first vehicle, wherein the reference to the identified object of the navigation instruction includes the property of the identified object.

15. A non-transitory computer-readable storage medium comprising computer-readable instructions, which when executed by a computing system, cause the computing system to:

receive image data representative of an environment around a first vehicle;

identify an object represented in the image data with a bounding box, the object being within a field of view of a driver of the first vehicle;

determine relative positioning of the identified object with respect to the first vehicle based on the bounding box represented in the image data; and responsive to determining the relative positioning of the identified object with respect to the first vehicle, generate a navigation instruction for the driver of the first vehicle that includes a reference to the identified object.

16. The non-transitory computer-readable storage medium of claim 15, wherein the instructions, which when executed by the computing system, further cause the computing system to:

determine a classification of the identified object based on the image data and referring to that classification in the reference to the identified object in the navigation instruction for the driver.

17. The non-transitory computer-readable storage medium of claim 15, wherein the instructions, which when executed by the computing system, further cause the computing system to:

determine, based on the image data, that the identified object is a second vehicle moving with a direction of travel.

18. The non-transitory computer-readable storage medium of claim 17, wherein the instructions, which when executed by the computing system, further cause the computing system to:

receive navigation data representing a planned route of the first vehicle; and determine that the direction of travel of the second vehicle corresponds to the planned route of the first vehicle and wherein the generated navigation instruction for the driver of the first vehicle includes an instruction to follow the second vehicle.

19. The non-transitory computer-readable storage medium of claim 17, wherein the instructions, which when executed by the computing system, further cause the computing system to:

determine the direction of travel of the second vehicle based on the image data, wherein the image data represents a plurality of images of the second vehicle at different times thereby signifying the direction of travel of the second vehicle.

20. The non-transitory computer-readable storage medium of claim 15, wherein the instructions, which when executed by the computing system, further cause the computing system to:

determine a property of the identified object based on the image data, the property including at least one of a color, a height, a width, and a depth of the first vehicle, wherein the reference to the identified object of the navigation instruction includes the property of the identified object.

* * * * *